United States Patent [19]
Dirlikov et al.

[11] Patent Number: 5,559,189
[45] Date of Patent: Sep. 24, 1996

[54] FAST CURING THERMOSETTING ACETYLENIC POLYMERIC VEHICLE

[75] Inventors: Stoil Dirlikov; Zhao Chen, both of Ypsilanti, Mich.

[73] Assignee: Easter Michigan University, Ypsilanti, Mich.

[21] Appl. No.: 195,541

[22] Filed: Feb. 14, 1994

(Under 37 CFR 1.47)

[51] Int. Cl.$^6$ ........................................................ C08F 8/32
[52] U.S. Cl. ...................... 525/105; 525/328.1; 525/343; 525/379; 525/381; 525/382; 525/384; 525/386
[58] Field of Search ................................. 525/328.1, 105, 525/343, 379, 381, 382, 384, 386

[56] References Cited

U.S. PATENT DOCUMENTS

| | | |
|---|---|---|
| 3,129,201 | 4/1964 | Miller . |
| 3,562,218 | 2/1971 | D'Alelio ............................... 525/328.1 |
| 3,562,230 | 2/1971 | D'Alelio ............................... 525/328.1 |
| 3,562,231 | 2/1971 | D'Alelio . |
| 3,562,236 | 2/1971 | D'Alelio ............................... 525/328.1 |
| 3,594,175 | 7/1971 | Hay . |
| 4,226,800 | 10/1980 | Picklesimer . |
| 4,885,403 | 12/1989 | Inbasekaran et al. . |
| 5,239,031 | 8/1993 | Yamada et al. ...................... 525/328.1 |
| 5,239,032 | 8/1993 | Yamada et al. ...................... 525/328.1 |

OTHER PUBLICATIONS

Wu et al., "Coatings Curable with Low–Emission Radiation," in *Radiation Curing of Polymeric Materials*, ACS Symposium Series 417, Washington, D.C. (1990).
Owen, "Olefinic Acids. Part I. The Reactivity of α–Bromocrotonic Acids." J. Am. Chem. Soc. 385 (1945).
Raphael, *Acetylenic Compounds in Organic Synthesis*, 127, Butterworths Scientific Publications (1955).
Rutledge, *Acetylenes and Allenes*, Reinhold Book Corp., New York, 283 (1969).
Kruse et al., "N,N–Dialkyl–1,1–dimethyl–2–butynylamines by the Reaction of Propyne with Secondary Aliphatic Amines," 83 J. Am. Chem. Soc. 213 (1961).
Kruse et al., "Ethylidenimies by the Reaction of Acetylene with Primary Aliphatic Amines," 83 J. Am. Chem. Soc. 216 (1961).
McMullen et al., "Elimination–Addition. Part VIII. Structures of Acetylene–Amine Adducts," (B) J. Chem. Soc. 1217 (1966).
Hay, "Oxidative Coupling of Acetylenes," 25 J. Org. Chem. 1275 (1960).
Hay, "Oxidative Coupling of Acetylenes II," 27 J. Org. Chem. 3320 (1962).
Hennion et al., "A Proposed Mechanism for Mercury Catalysis in Acetylene Addition Reactions", 1 J. Org. Chem. 159 (1936).
Glaser, 154 Ann. 137 (1870).
Glaser, 2 Ber. 422 (1869).
Hay et al., "Photosensitive Polyacetylenes," 8 Polymer Letters 97 (1970).
Dirlikov, "Propargyl–Terminated Resins—A Hydrophobic Substitute for Epoxy Resins," 2(1) High Performance Polymers 67 (1990).
Eglington et al., "The Coupling of Acetylenic Compounds" in *Advances in Organic Chemisty*, 225, Interscience Publishers, N.Y. (1963).
Feng et al., "Mechanism of B–Staging and Curing of Propargyl Terminated Resins," 60 Polymer Mat. Sci. Eng. 618 (1989).
Bowden et al., "Researches on Acetylenic Compounds Part VIII. Miscellaneous Addition Reactions of Ethynyl Ketones," J. Am. Chem. Soc. 945 (1946).
Chen et al., "Air–Drying Mechanism of Propargyl Terminated Resins; I. Cobalt Drier," 69 Polym. Mater. Sci. Eng. 388 (1993).
Dirlikov, "A Review on Propargyl Terminated Resins," 62 Proc. Polym. Mat. Sci. Eng. 603 (1990).

*Primary Examiner*—Bernard Lipman
*Attorney, Agent, or Firm*—Fitch, Even, Tabin & Flannery

[57] ABSTRACT

This invention is directed to fast curing polymer compositions, These compositions comprise a blend of (1) a polymer having pendent activated acetylenic groups and ammonia or a comonomer having at least two functional groups which are reactive with the activated acetylenic groups of the polymer, or (2) a blend of a monomer having at least two activated acetylenic groups and ammonia and/or a comonomer having at least two functional groups which are reactive with the activated acetylenic groups of the monomer.

20 Claims, No Drawings

FAST CURING THERMOSETTING ACETYLENIC POLYMERIC VEHICLE

This invention relates to fast curing thermosetting acetylenic polymeric vehicles. More specifically, a polymeric vehicle is provided which comprises a blend of (1) a polymer having pendent activated acetylenic groups and ammonia or a comonomer having at least two functional groups which are reactive with the activated acetylenic groups of the polymer, or (2) a blend of a monomer having at least two activated acetylenic groups and ammonia and/or a comonomer having at least two functional groups which are reactive with the activated acetylenic groups of the monomer.

BACKGROUND OF THE INVENTION

Thermosetting coating polymers have commonly involved cross-linking polymers such as epoxy polymers, or polyester polymers having active hydrogens reactive with polyisocyanates. Polyisocyanates are toxic, water sensitive and often inconveniently require prepolymers which increase costs. Epoxy systems also are sensitive to moisture and may be toxic.

Because of their inherent scientific interest and their many actual and potential commercial applications, acetylene and non-polymeric compounds containing acetylenic groups have been extensively studied. Many reports have focused on the reactivity of acetylene. The carbon-carbon triple bonds are known to react with alcohols, acids, amines and other organic compounds with mobile hydrogen atoms under certain conditions (catalyst, temperature, pressure) to form the corresponding vinyl derivatives. This reaction is known as vinylation. These types of reactions are limited in that they only occur when carried out in an appropriate medium in the presence of a catalyst. Hennion et al., *A Proposed Mechanism for Mercury Catalysis in Acetylene Addition Reactions*, 1 J. Org. Chem. 159 (1936); Rutledge, T. F., *Acetylenes and Allenes*, Reinhold Book Corp., New York, 283 (1969). Further, while acetylene is known to react with primary and secondary aliphatic amines, this reaction also requires specific conditions and the presence of a catalyst. Kruse et al. *Ethylidenimies by the Reaction of Acetylene with Primary Aliphatic Amines*, 83 J. Am. Chem. Soc. 213 (1961); Kruse et al. *N,N,-Dialkyl-1,1-dimethyl-2-butynylamines by the Reaction of Propyne with Secondary Aliphatic Amines*, 83 J. Am. Chem. Soc. 213 (1961).

Other studies involving non-polymeric acetylenic compounds have been conducted to determine the effects of substitution on the reactivity of acetylenic groups. For example, Bowden et al. describes the addition reaction of a substituted acetylenic ketone according to the following reaction:

$$RCOC\equiv CH + HX \rightarrow RCOCH=CHX$$

where the HX group included ammonia and amine, sulfonic acids, ethylthiol and thiophenol, alcohol and phenol, halogens, hydrogen bromide, and water. Bowden et al. *Researches on Acetylenic Compounds. Part VIII. Miscellaneous Addition Reactions of Ethynyl Ketones*, J. Am. Chem. Soc. 945 (1946). Further, the reactivity of primary and secondary amines to acetylenes activated by the groups PhCO—, PhCH$_2$N(Me)CO—, MeOCO—, PhCH$_2$SO—, and PhCH$_2$SO$_2$— (wherein Ph is phenyl and Me is methyl) has been described. McMullen et al. *Elimination-Addition. Part VIII. Structures of Acetylene-Amine Adducts*, (B) J. Chem. Soc. 1217 (1966).

While these references describe acetylenic and substituted acetylenic compounds, the references do not even suggest the use of these compounds in connection with the preparation of thermosetting polymers, or that acetylenic compounds have desirable reactivity to advantageously provide polymers and polymeric vehicles with properties which are desirable for coatings.

Acetylene based polymers are known. For example, Dirlikov has described the development of acetylene-terminated resins (ATRs) for use as hydrophobic thermosetting material. Dirlikov, *Propargyl-terminated Resins—A Hydrophobic Substitute for Epoxy Resins*, 2(1) High Performance Polymers 67 (1990). These ATRs are based on propargyl derivatives of bisphenols and phenolformaldehyde resins. These polymers, however, required considerable curing at high temperatures such as 208° C. for 4 hours and 260° C. for 6 hours.

An object of this invention is to provide a fast curing polymeric vehicle which will cure into a coating binder which is hard, has good impact resistance and is resistant of acidic and basic environments.

Another object of this invention is to provide a polymeric vehicle which is water insensitive and has a reduced toxicity over thermosetting polymeric vehicles which include isocyanates or epoxies.

Yet another object of this invention is to provide a fast curing polymeric vehicle which will cure into a coating binder at room temperature without catalysts.

Further objects and advantages of the invention will be found by reference to the following description.

SUMMARY OF THE INVENTION

The invention provides a fast curing polymeric vehicle for a coating binder where the cure takes place at lower temperatures and faster than previously attainable. The invention includes a coreactant with two or more functional groups which is reactive with a reactant which may be a polymer or monomer. The functional groups of the coreactant are reactive with the activated acetylenic groups of the reactant. Activated acetylenic groups are pendent from the polymer, or two or more activated acetylenic groups form part of the monomers. A blend of the reactant and coreactant provides a polymeric vehicle having low toxicity, moisture insensitivity, and a coating binder which is resistant of acid and basic environments.

In one aspect, the invention is a polymeric vehicle which provides a coating binder having a glass transition temperature (Tg) of not more than about 120° C., a pencil hardness of at least about B and an impact resistance of at least about 50 inch-pounds after being applied to a substrate at about 1 to 3 mils wet and heat cured at not more than about 100° C. for not more than about 60 minutes.

In an important part of this aspect, the polymeric vehicle comprises a blend of a monomer having at least two activated acetylenic groups, a coreactant (which may be ammonia) having at least two coreactant functional groups reactive with the activated acetylenic groups of the monomer. The monomer has an activating group adjacent to each acetylene group in the monomer. The activating group is bonded to at least one carbon atom which is a part of the triple bonded carbon atoms in the acetylenic group in the monomer. In this aspect, the activating group is selected from the group consisting of

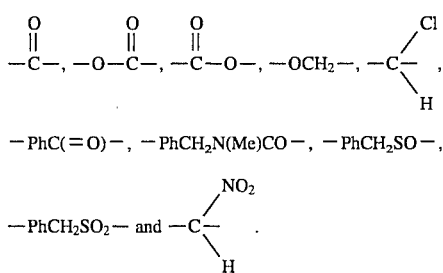

—PhC(=O)—, —PhCH₂N(Me)CO—, —PhCH₂SO—,

—PhCH₂SO₂— and $$-C\begin{smallmatrix}NO_2\\ \diagup\\ \diagdown\\ H\end{smallmatrix}$$

The reactant functional group has a mobile hydrogen atom and generally may be selected from the group consisting of amino, hydroxyl, carboxyl, thiol and $X[Si(R_1)(R_2)O]_n Si(R_1)(R_2)X$, wherein X is H or OH and wherein $R_1$ and $R_2$ are 1 to 4 carbon alkyl or phenyl groups and n=0 to 100 and, preferably, 1–20. Further, the monomer should be substantially free of functional groups which are reactive with the acetylenic groups.

Another important aspect of this invention involves the coupling of polymers having pendent activated acetylenic groups through the reaction of the pendent acetylenic groups with the coreactant. In this aspect, the polymeric vehicle comprises a blend of the polymer selected from the group consisting of a homopolymer and copolymer of alpha, beta unsaturated monomers with activated acetylenic groups and a coreactant as described above. The coupling reaction of the polymeric reactant with the acetylenic groups provide the coating binder. In this aspect, the reactant polymer in the blend prior to the curing coupling reaction has a number average molecular weight $(M_n)$ in the range of from about 500 to about 100,000 and from about 1 to about 100 molar percent of the monomeric units which form the polymer have at least one activated acetylenic group.

In another very important aspect, the invention provides a composition which can be rapidly cured at a temperature of not more than about 30° C. in not more than about 30 minutes. In this aspect, the composition comprises a blend of a (1) polymer having pendent activated acetylenic groups or monomers having at least two activated acetylenic groups and (2) a coreactant having at least two amino functional groups which are reactive with the activated acetylenic groups of the monomer or polymer. As with the other aspects of the invention, the polymer with pendent acetylenic groups or monomer has an activating group adjacent to each acetylene group. The activating group is bonded to a carbon atom which is a part of the acetylenic group in the monomer or polymer. As with the other aspects of the invention, the monomer or polymer should also be substantially free of functional groups which are reactive with the acetylenic groups of that monomer. In this aspect, however, the activating group of the monomer is selected from the group consisting of

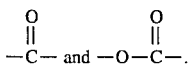

The coreactant functional group is amino. In this aspect, the reaction between the monomer or polymer and amino coreactant is substantially complete in less than about one minute. In this aspect of the invention, the reaction is considered substantially complete when at least about 80 percent of the acetylenic groups have reacted with the amino coreactant. Further in this aspect of the invention, the composition may provide a polymeric vehicle for a coating binder for a paint coating having a hardness of at least about B, a $T_g$ and an impact resistance as aforesaid. Alternatively the fast curing resin may be used as a resinous component in an adhesive.

In another aspect, the invention provides a method of coating a substrate with a cured coating binder by first coating the substrate with the reactant having the activated acetylenic functionality and then exposing the coated substrate with a gaseous coreactant such as ammonia, ethyl amine, methyl amine, diethylenetriamine or other volatile amines which rapidly react with the acetylenic reactant to provide a coating binder.

DETAILED DESCRIPTION OF THE INVENTION

Definitions

As used in this application, the term "polymeric vehicle" means all polymeric and resinous components in the formulated coating, i.e., before film formation. "Coating binder" means the polymeric part of the film of the coating after solvent has evaporated and after cross-linking. "Formulated coating composition" means the polymeric vehicle and solvents, pigments, catalysts and additives which may optionally be added to impart desirable application characteristics to the formulated coating and desirable properties such as opacity and color to the film.

"Organic solvent" means a liquid which includes but is not limited to carbon and hydrogen which liquid has a boiling point in the range of from about 35° C. to about 300° C. at about one atmosphere pressure.

"Film" is formed by application of the formulated coating to a base or substrate, evaporation of solvent, if present, and cross-linking.

"Thermosetting formulated coating" and "thermosetting polymeric vehicle" mean a formulated coating composition and polymeric vehicle that provide optimum film properties upon heating.

"Acetylenic group" means —C≡C—.

"Coreactant" means a compound with two or more functional groups reactive with the activated acetylenic groups which form part of a polymer or monomer. As used herein, ammonia is a trifunctional comonomer.

"Hydrolyzable bond" means bonds which include carboxylic ester linkages, urethane linkages, carbonate linkages and "activated ethers" such as —OCH₂N<, urea linkages and amide linkages.

"Acrylic polymer" means a polymer or copolymer of the following "acrylic monomers" which monomers may be substituted with one or more activated acetylenic groups according to the invention.

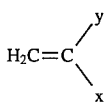

wherein y = CH₃ or H

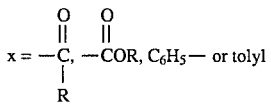

R = straight chain or branched alkyls having 1 to 12 carbons,

-continued

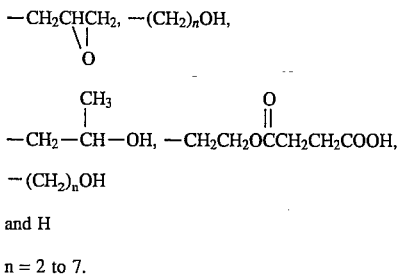

n = 2 to 7.

In the case of hydroxy-substituted alkyl acrylates the monomers may include members selected from the group consisting of the following esters of acrylic or methacrylic acid and aliphatic glycols: 2-hydroxy ethyl acrylate; 3-chloro-2-hydroxypropyl acrylate; 2-hydroxy-1-methylethyl acrylate; 2-hydroxypropyl acrylate; 3-hydroxypropyl acrylate; 2,3-dihydroxypropyl acrylate; 2-hydroxybutyl acrylate; 4-hydroxybutyl acrylate; diethylene glycol acrylate; 5-hydroxypentyl acrylate; 6-hydroxyhexyl acrylate; triethyleneglycol acrylate; 7-hydroxyheptyl acrylate; 2-hydroxy-1-methylethyl methacrylate; 2-hydroxy propyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6-dihydroxyhexyl methacrylate; and 7-hydroxyheptyl methacrylate.

The monomers such as the above acrylic monomers which provide the polymer are $\alpha,\beta$ unsaturated monomers which are free radically polymerized through the double bond in the monomer.

The Invention

The invention comprises a blend of a coreactant having at least two coreactant functional groups reactive with activated acetylenic groups and a reactant selected from the group consisting of a polymer having pendent activated acetylenic groups and a monomer having at least two activated acetylenic groups.

The activated acetylenic groups of the polymer and monomer are activated by activating groups which are adjacent to one of the carbon atoms which form the triple bond of the acetylenic group as is shown in the general formula

—YC≡CX— wherein X is the activating group and Y=H,

The activating group is selected from the group consisting of

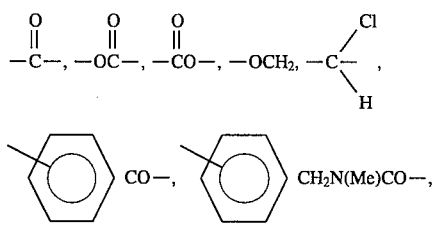

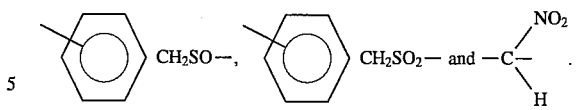

Monomers having activated acetylenic groups which are particularly useful in the invention include
HCC≡CCOO(CH$_2$)$_4$OOCC≡CH,
HC≡CCOOCH$_2$CH(CH$_3$)CH$_2$OOCC≡CH,
(HC≡CCOOCH$_2$)$_3$CCH$_2$CH$_3$, and (HC≡CCOOCH$_2$)$_4$C.

Monomers with acetylenic groups activated with —O(O≡C)— groups can be made by reacting polyols having two or three hydroxyls, which are known to be reactive with isocyanates, with HOOCC≡CH to provide R[O(O≡)CC≡CH]$_n$ where n=2–5 or poly. In this connection trimethylol propane, ethylene glycol, 1,4 butane diol, 1,6 hexane diol, neopentyl glycol, diethylene glycol, triethylene glycol, dipropylene glycol, trimethylolethane, cyclohexanedimethanol and pentaerythritol may be used as a polyol to make a —O(O≡)C— activated acetylene monomer.

To make a keto activated acetylene group

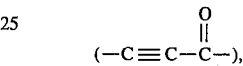

a di or tri acid halide (such as an acid chloride) is reacted with the alkali metal salt MC≡CH wherein M=alkali metal. The following is an illustrative reaction:
Cl(O≡)CRC(≡O)Cl+NaC≡CH provides HC≡CC(≡O)RC(≡O)C≡CH. Suitable acid halides which may be used in this reaction include the halides of carboxylic acids which are known to be reactive with epoxy groups, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid itaconic acid, citraconic acid, mesaconic acid and glutaconic acid. Monomers which include the other activating groups such as

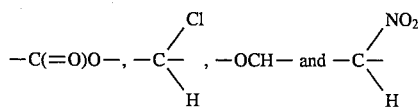

may be made as is known in the art. The activated acetylenic monomer should be free of functional groups which are reactive with the acetylenic groups to prevent reactions of the monomer with itself, which reactions may be undesirably spontaneous at varying temperatures. The monomers react with the coreactant having a group with a mobile hydrogen atom such as amino, hydroxyl, carboxyl, thiol and X[Si(R$_1$)(R$_2$)O]$_n$Si(R$_1$)(R$_2$)X, wherein X is H or OH and wherein R$_1$ and R$_2$ are 1 to 4 carbon alkyl or phenyl groups and n=0 to 100 and, preferably, 1–20, at not more than 100° C. for not more than 60 minutes to provide the coating binder having a Tg of not more than 120° C., a pencil hardness of at least about B after being applied to the substrate at about 1 to about 3 mils wet.

In the aspect of the invention which includes a polymer of alpha, beta unsaturated monomers with activated acetylenic groups, the polymer together with the coreactant may be used as the components of the polymeric vehicle. The polymers have sufficient substitution of pendent activated acetylenic groups which are effective for cross-linking through the coreactant at elevated temperatures to provide a coating binder with a hardness of at least about B and an impact resistance of at least about 50 inch-pounds after application to a substrate at a thickness of about 1 to about 3 mils wet. Substitution of the polymer with activated acetylenic groups is such that from about 1 to about 100 molar % of the monomeric units which form the polymer are substituted with an activated acetylenic group. Prior to cross-linking through the coreactant, the polymer with pendent activated acetylenic groups has a number average molecular weight in the range of from about 500 to about 100,000.

The monomers which provide the polymer are α,β unsaturated monomers which are free radically polymerized through the double bond in the monomer. Of this class of monomers, acrylic monomers having the formula

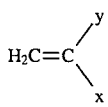

as previously described herein are particularly useful in practicing the invention. From about 1 to about 100 molar % of these acrylic monomers may be substituted with activated acetylenic groups such that after polymerization, the resulting homo or copolymer of the α,β unsaturated monomers will have pendent acetylenic groups extending therefrom. Particularly useful monomers with pendent acetylenic groups which may be polymerized to provide a polymer according to the invention include propargyl methacrylate, propargyl acrylate, propargyl ether of 4-vinyl phenol, and pentene-4-yn-1-one, and 2-methylpentene-4-yn-1-one.

Acrylic homopolymers and copolymers that contain pendent activated acetylenic groups may be prepared by solution polymerization of the corresponding monomers in acetone under reflux in the presence of azobisisobutyronitrile (AIBN) or other initiator.

Poly 2-methylpentene-4-yn-1-one may be obtained by solution polymerization of 2-methylpentene-4-yn-1-one in acetone under reflux in the presence of benzoyl peroxide (or AIBN) as an initiator according to the following reaction.

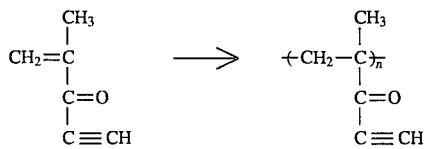

The polymer is soluble in common organic solvents, such as methyl ethyl ketone and dimethyl formamide.

In the aspect of the invention where the polymeric vehicle comprises a polymer with pendent acetylenic groups, not all of the monomeric units of the polymer may be substituted with activated acetylenic groups. In contrast to the homopolymers which have an activated acetylenic group for each monomer unit, copolymers that contain a low content of activated acetylenic groups, such as below 1 molar % of the monomeric units do not cross-link effectively even at very high monomer conversion. Copolymer solutions having at least one molar percent monomers with activated acetylenic groups, however, and preferably from about 5 to about 20 molar percent, may be used directly (without polymer precipitation) for curing in solution or preparation of coatings on cold rolled steel panels. Examples of particularly useful monomers which do not include activated acetylenic groups and which may be copolymerized with monomers which include activated acetylenic groups to provide a polymer which may be cross-linked to provide a coating binder, include the monomers—acrylic acid, methacrylic acid, methyl methacrylate, butylacrylate, acrylonitrile, acrylamide, styrene, 1,3-butadiene, 1-hexene, p-tert. butylstyrene, chloroprene, chlorostyrene, isobutylene, 2,3-dimethylbutadiene, ethyl acrylate, methacrylonitrile, alpha-methylstyrene, 4-methylpentene-1, alpha-olefins, vinyl isobutyl ether and 4-vinylpyridine.

While the substituted polymers of the invention may be made by polymerizing substituted monomers, activated acetylenic groups also can be grafted onto the polymeric chain by reacting an acetylenic substituted compound with a functional group which is reactive with a functional group pending from the polymer chain to form a polymer with pendent activated acetylenic groups. In this connection, poly (propargyl ether of 4-vinylphenol) was grafted with quantitative yield in a one-step reaction by refluxing poly (4-vinylphenol) in acetone according to the following reaction:

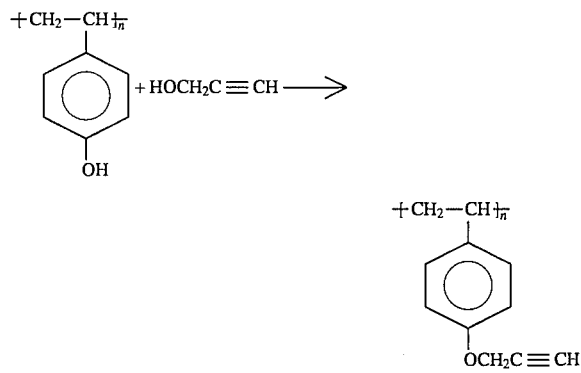

Poly (vinyl acetate) may be grafted as follows:

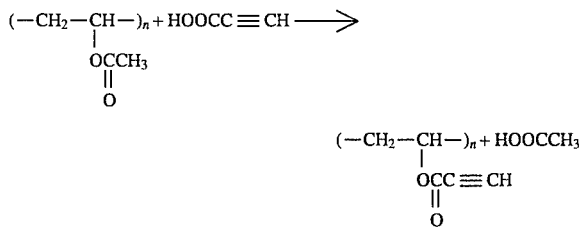

The coreactant has two or more functional groups which are sufficiently reactive with the activated acetylenic groups of the monomer or polymer with pendent activated acetylenic groups to provide a coating binder with a pencil hardness of about B and a Tg and impact resistance as aforesaid in about 60 minutes after the coating application at a temperature of not more than 100° C. The functional groups of the coreactant may be selected from the group consisting of amino, hydroxyl, carboxyl, and $X[Si(R_1)(R_2)O]_nSi(R_1)(R_2)]X$ wherein X is H or OH, wherein $R_1$ and $R_2$ and n are defined above. Polyfunctional coreactants which may be used in the invention include polyols which are reactive with isocyanates as aforesaid, polyacids reactive with epoxy groups as aforesaid and amines which are used to make urethanes or cure epoxy resins. The latter amines include diethylenetriamine, triethylenetetramine, poly (oxypropylene diamine), poly (oxypropylene triamine), poly (glycol amine), isophorone diamine, 1,2-diaminocyclohexane, N-aminoethylpiperazine, 4,4'-diaminodiphenylmethane, 4,4'-diaminodiphenyl sulfone, m-phenylenediamine.

The ease of cure and the rate of the reaction of the reactant with the coreactant is highly dependent upon the activation of the acetylenic bonds by the activating group and the reactivity of the reactant functional group. In general, the curing reaction may require temperatures of up to about 100° C.; and in the case of activation by the ether group, a catalyst such as cadmium, zinc, or mercuric acetate may be required to keep the curing temperature below 100° C.

In an important aspect of the invention, the activating group is $$\overset{O}{\underset{\|}{-C-}}, \text{ or } \overset{O}{\underset{\|}{OC-}}.$$

These groups when a part of monomers or polymers provide a particularly reactive acetylenic bond with a coreactant which has an amino functionality. The importance of the functionality of the coreactant coupled with the aforedescribed specific activating groups is illustrated in Table I below.

| | Amine |
|---|---|
| $\overset{O}{\underset{\|}{R-CC}}\equiv CH$ | Room Temperature/no cat.- 1 min. |
| ROOCC≡CH | Room Temperature/no cat.- 1 min. |
| Where R = | Aliphatic, cycloaliphatic or aromatic residue; where such residues do not have more than about 25 carbons, and |
| Amine = | diethylenetriamine, triethylenetetramine, poly (oxypropylene diamine), poly (oxypropylene triamine), poly (glycol amine), isophorone diamine, 1,2-diaminocyclohexane, N-aminoethylpiperazine, 4,4'-diamino-diphenylmethane, 4,4'-diaminodiphenyl sulfone, m-phenylenediamine. |

Hence in general, monomers activated by a keto or $$\overset{O}{\underset{\|}{-OC-}}$$

groups permit substantially complete curing with an amino functional coreactant at not more than 30° C. for not more than 30 minutes. A cure will be substantially complete when at least about 80 percent of the acetylenic groups have been reacted with amino coreactant. In this fast cure aspect of the invention, the composition of the invention is not limited to polymeric vehicles with specific hardnesses and impact resistances, but the composition of the invention may be used as a part of a fast setting adhesive.

A catalyst may be added to the systems described herein. Examples, catalysts useful in this invention include those selected from the group consisting of sodium carbonate, potassium hydroxide, pyridine, tert. butylamine, N,N,N',N', -tetramethylethylenediamine, and other tertiary amines.

The hardness and impact resistance of coating binders made from the polymeric vehicles of the invention may be controlled through the number of functional groups on the coreactant or the reactant which is the monomer and polymer with the pendent activated acetylenic groups. If the monomer has more than two acetylenic groups or the coreactant has more than two coreactant functional groups, a three-dimensional polymeric lattice will be formed. In general, the three-dimensional lattice provides improved hardness and solvent resistance. Such a lattice, however, may generally reduce impact resistance. Coreactants with three or more functional groups which are suitable for making a polymeric network include diethylenetriamine, triethylenetetramine, poly (oxypropylene triamine), and trimethylolpropane.

The monomers, the polymer with pendent activated acetylenic groups and coreactant may be substantially free, and the resulting reaction product may be substantially free of hydrolyzable bonds. The hydrolyzable bonds result in a sensitivity of the coating binder to acidic or basic conditions which could include those conditions provided by acid rain, oven cleaners, detergents and the like. Acidic or basic conditions cleave hydrolyzable bonds in the polymeric vehicle and have a deleterious effect on the coating binder. Hydrolyzable bonds include carboxylic esters, urethanes, carbonates, activated ethers, such as an ether activated with —CH₂N<. In this aspect, the activating groups $$\overset{O}{\underset{\|}{-OC-}} \text{ and } \overset{O}{\underset{\|}{-C-O-}}$$

for the acetylene group should be avoided.

A blend of the monomer or polymer with activated groups may be the sole components of a polymeric vehicle for a coating, to which may be added solvents and known additives such as pigments and catalysts, to provide a formulated coating composition which upon heating provides a coating binder which has a pencil hardness of at least about B and impact resistance of at least about 50 inch-pounds.

A gaseous coreactant such as ammonia, methyl amine, ethyl amine, diethylenetriamine or other volatile amines may be reacted with the reactant monomers or polymer to provide the polymeric vehicle. In this aspect, the reactant in combination with pigments, additives and solvents may be applied to a substrate and then exposed to the gaseous coreactant and elevated temperatures such as about 80° C. to about 100° C. to provide a coating binder on the substrate.

The following examples illustrate methods for carrying out the invention and should be understood to be illustrative of, but not limiting upon, the scope of the invention which is defined in the appended claims.

EXAMPLE I

Preparation of Difunctional Acetylenic Monomers

Difunctional monomers, 1,4-butanediol dipropiolate and 2-methyl-1,3-propanediol dipropiolate were prepared by azeotropic condensation.

A. Preparation of 1,4-Butanediol Dipropiolate

The 1,4-butanediol dipropiolate was prepared as follows. A solution of 27.5 g. (0.393 mole) of propiolic acid in 75 ml of benzene was reacted with 16.07 g. (0.179 mole) of 1,4-butanediol in the presence of 1.5 g. paratoluenesulfonic acid as a catalyst. The reaction mixture was stirred and heated to reflux under nitrogen until 6.44 g. of water was azeotroped over into a Dean-Stark trap. The reaction mixture was washed with 10% sodium carbonate aqueous solution until the pH value of the mixture was basic, then washed with deionized water several times and dried over sodium carbonate. The solvent was removed on a Rotavapor and 1,4-butanediol dipropiolate was obtained in 90% yield as white crystals with a melting point of 59° C. The structure of 1,4-butanediol dipropiolate is as follows:

HC≡CCOO(CH₂)₄OOCC≡CH.

11

B. Preparation of 2-Methyl-1,3-propanediol Dipropiolate

The 2-methyl-1,3-propanediol dipropiolate was prepared as follows. A solution of 23.1 g. (0.33 mole) of propiolic acid in 75 ml of benzene was reacted with 13.5 g. (0.15 mole) of 2-methyl-1,3-propanediol dipropiolate in the presence of 1.1 g. of para-toluene sulfonic acid as a catalyst. The reaction mixture was stirred and heated to reflux under nitrogen until 5.4 g. of water was azeotroped over into a Dean-Stark trap. The reaction mixture was washed with 10% sodium carbonate aqueous solution until the pH value of the mixture was basic, then washed with deionized water several times and dried over sodium carbonate. The solvent was removed on a Rotavapor and 2-methyl-1,3-propanediol dipropiolate was obtained in 90% yield as a pale yellow liquid. The structure of 2-methyl-1,3-propanediol dipropiolate is as follows:

$HC{\equiv}CCOOCH_2CH(CH_3)CH_2OOCC{\equiv}CH$

EXAMPLE II (Polymerization and Film Properties of 2-Methyl-1,3-Propanediol Dipropiolate of Example I)

A. 2-Methyl-1,3-propanediol Dipropiolate+Diethylenetriamine 0.58 g. (0.003 mole) of 2-methyl-1,3-propanediol dipropiolate in 2 ml of acetone is mixed with 0.21 g. (0.002 mole) of diethylenetriamine in 2 ml of acetone at low temperature (0° to 5° C.) and used immediately for coating preparation. Good coatings are obtained within an hour after the application of this solution on cold-rolled steel panels. Coating thickness was about 1 mil.

The coating properties were determined 24 hours after the film formation according to the corresponding ASTM test methods:

| Property | Test | Property Value Observed |
| --- | --- | --- |
| Sward Hardness | ASTM D2134-66 | 36 |
| Pencil Hardness | ASTM D3363-74 | 5H |
| Adhesion | ASTM D3359-78 | 5B |
| Impact Strength | ASTM D2794-84 | 160/160 in-lb |
| Direct/Reverse Flexibility | ASTM D4145-83 | Pass |
| Solvent Resistance | ASTM D4752-87 | >200 MEK double rubs |

B. 2-Methyl-1,3-Propanediol Dipropiolate+Azelaic Acid 0.19 g. of 2-methyl-1,3-propanediol dipropiolate and 0.045 g. of the tertiary amine N,N,N'N'-tetramethylethylenediamine were added into a solution of 0.19 g. of azelaic acid dissolved in 0.78 g. dimethyl formamide and used immediately for coating preparation. Good coatings on cold-rolled steel panels were obtained from this solution after solvent evaporation followed by baking at 110° C. for two hours. Coating thickness was about 1 mil.

The coating properties were determined according to the corresponding ASTM test methods:

| Property | Test | Property Value Observed |
| --- | --- | --- |
| Sward Hardness | ASTM D2134-66 | 28 |
| Pencil Hardness | ASTM D3363-74 | H |
| Adhesion | ASTM D3359-78 | 5B |
| Impact Strength | ASTM D2794-84 | 160/160 in-lb |
| Direct/Reverse Flexibility | ASTM D4145-83 | Pass |
| Solvent Resistance | ASTM D4752-87 | 50 double MEK rubs |

EXAMPLE III

Preparation of Trifunctional Acetylenic Monomer

Trifunctional monomer trimethylolpropane tripropiolate was prepared by azeotropic condensation.

A. Preparation of Trimethylolpropane Tripropiolate

Preparation of the trimethylolpropane tripropiolate was as follows: A solution of 7.09 g. (0.1 mole) of propiolic acid in 50 ml of benzene was reacted with 4.12 g. (0.03 mole) of trimethylol propane in the presence of 1.01 g. para-toluenesulfonic acid as a catalyst. The reaction mixture was stirred and heated to reflux under nitrogen until 1.66 g. of water were azeotroped over into a Dean-Stark trap. The reaction mixture was washed with 10% sodium carbonate aqueous solution until the pH value of the mixture was basic, then washed with deionized water several times and dried over a molecular sieve. The solvent was removed on a Rotavapor and trimethylol propane tripropiolate was obtained in 80% yield.

The structure of trimethylolpropane tripropiolate is as follows:

$(HC{\equiv}CCOOCH_2)_3CCH_2CH_3$

B. Polymerization and Film Properties of Trimethylol Propane Tripropiolate 0.58 g. of trimethylol propane tripropiolate and 0.1 g. of the tertiary amine N,N,N'N'-tetramethylethylenediamine were added into a solution of 0.564 g. of azelaic acid dissolved in 1.0 g. dimethyl formamide and used immediately for coating preparation. Good coatings on cold-rolled steel panels were obtained from this solution by baking at 110° C. for two hours. Coating thickness was about 1 mil.

The coating properties were determined according to the corresponding ASTM test methods:

| Property | Test | Property Value Observed |
| --- | --- | --- |
| Sward Hardness | ASTM D2134-66 | 32 |
| Pencil Hardness | ASTM D3363-74 | 5H |
| Adhesion | ASTM D3359-78 | 5B |
| Impact Strength | ASTM D2794-84 | 160/160 in-lb |
| Direct/Reverse Flexibility | ASTM D4145-83 | Pass |
| Solvent Resistance | ASTM D4752-87 | >200 double MEK rubs |

What is claimed is:

1. A polymeric vehicle comprising:
   a reactant selected from the group consisting of a homopolymer of alpha, beta unsaturated monomers and a copolymer of alpha, beta unsaturated monomers, the homopolymer and copolymer having pendent activated acetylenic groups; and
   a coreactant having at least two functional groups reactive with the activated triple bonds of the reactant, the activating group selected from the group consisting of

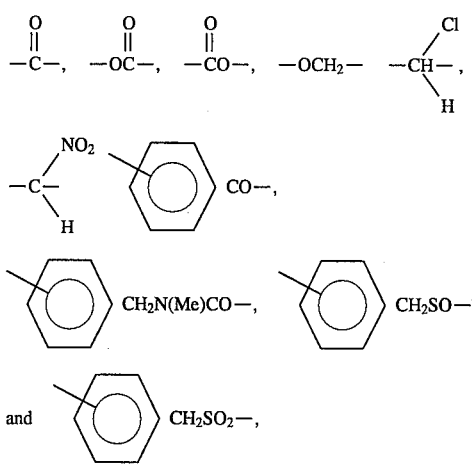

the coreactant functional group selected from the group consisting of amino, hydroxyl, carboxyl, thiol and $X[Si(R_1)(R_2)O]_nSi(R_1)(R_2)X$, wherein X is H or OH, wherein $R_1$ and $R_2$ are 1 to 4 carbon alkyl or phenyl groups and n=0 to 100.

2. A polymeric vehicle as recited in claim 1 wherein the coreactant is an amine.

3. A polymeric vehicle as recited in claims 1 or 2 wherein the activating group is selected from the group consisting of

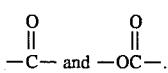

4. A polymeric vehicle as recited in claim 1 wherein the reactant is the polymer having the pendent activated acetylenic groups, the polymer having a number average molecular weight in the range of from about 500 to about 100,000 and from about 1 to about 100 molar % of the monomeric units which form the polymer are substituted with at least one activated acetylenic group.

5. A polymeric vehicle as recited in claim 2 wherein the reactant is the polymer having the pendent activated acetylenic groups, the polymer having a number average molecular weight in the range of from about 500 to about 100,000 and from about 1 to about 100 molar % of the monomeric units which form the polymer are substituted with at least one activated acetylenic group.

6. A polymeric vehicle as recited in claim 3 wherein the reactant is the polymer having the pendent activated acetylenic groups, the polymer having a number average molecular weight in the range of from about 500 to about 100,000 and from about 1 to about 100 molar % of the monomeric units which form the polymer are substituted with at least one activated acetylenic group.

7. A polymeric vehicle as recited in claims 1 or 4 wherein the coreactant is a gas selected from the group consisting of ammonia, methyl amine, ethyl amine and diethylenetriamine.

8. A polymeric vehicle as recited in claim 3 wherein the coreactant is a gas selected from the group consisting of ammonia, methyl amine, ethyl amine and diethylenetriamine.

9. A polymeric vehicle as recited in claim 1 wherein the activating group is selected from the group consisting of

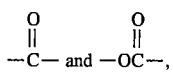

wherein the reactant is the polymer having the pendent activated acetylenic groups, the polymer having a number average molecular weight in the range of from about 500 to about 100,000 and from about 1 to about 100 molar % of the monomeric units which form the polymer are substituted with at least one activated acetylenic group and wherein the coreactant is a gas selected from the group consisting of ammonia, methyl amine, ethyl amine and diethylenetriamine.

10. The polymeric vehicle recited in claim 1 wherein the coreactant is selected from the group consisting of propyldiamine, hexamethylenediamine, diethylenetriamine, triethylenetetramine, 1,y-diaminediphenylmethane, and mixtures thereof.

11. A polymeric vehicle which provides a coating binder having a glass transition temperature of not less than about 20° C., a pencil hardness of at least about B and an impact resistance of at least about 50 inch-pounds after being applied to a substrate at about 1 to about 3 mils wet and heated, the polymeric vehicle comprising:

a reactant selected from the group consisting of a homopolymer of alpha, beta unsaturated monomers and a copolymer of alpha, beta unsaturated monomers, the homopolymer and copolymer having pendent activated acetylenic groups; and a coreactant having at least two functional groups reactive with the activated triple bonds of the reactant, the activating group selected from the group consisting of consisting of

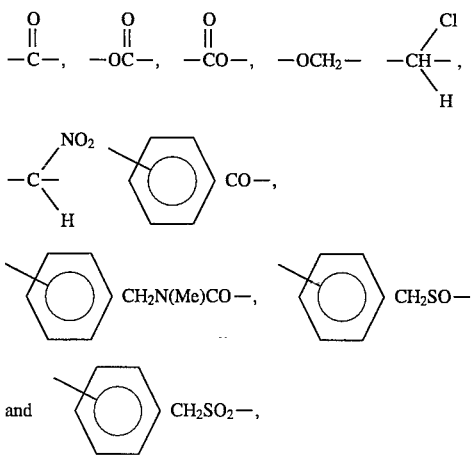

the coreactant functional group selected from the group consisting of amino, hydroxyl, carboxyl, thiol and $X[Si(R_1)(R_2)O]_nSi(R_1)(R_2)X$ wherein X is H or OH, wherein $R_1$ and $R_2$ are 1 to 4 carbon alkyl or phenyl groups and n=0 to 100.

12. A polymeric vehicle as recited in claim 11 wherein the coreactant is an amine.

13. A polymeric vehicle as recited in claims 11 or 12 wherein the activating group is selected from the group consisting of

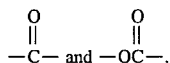

14. A polymeric vehicle as recited in claim 11 wherein the coreactant is a gas selected from the group consisting of ammonia, methyl a/nine, ethyl amine and diethylenetriamine.

15. A composition comprising:

a reactant selected from the group consisting of a homopolymer of alpha, beta unsaturated monomers and a copolymer of alpha, beta unsaturated monomers, the homopolymer and copolymer having pendent activated acetylenic groups; and a coreactant having at least two amino functional groups reactive with the activated triple bonds of the reactant, the activating group selected from the group consisting of

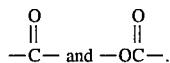

16. A composition as recited in claims 15 wherein the reactant is the polymer having the pendent activated acetylenic groups, the polymer having a number average molecular weight in the range of from about 500 to about 100,000 and from about 1 to about 100 molar % of the monomeric units which form the polymer are substituted with at least one activated acetylenic group.

17. A process for preparing a coating binder, the process comprising:

mixing a reactant and a coreactant, the reactant selected from the group consisting of a homopolymer of alpha, beta unsaturated monomers and a copolymer of alpha, beta unsaturated monomers, the homopolymer and copolymer having pendent activated acetylenic groups, the activating group selected from the group consisting of

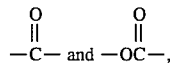

the coreactant having at least two amino functional groups reactive with the activated triple bonds of the reactant, and heating the polymeric vehicle at a temperature of not more than about 30° C. for not more than 30 minutes to form the coating binder.

18. The process as recited in claim 17 wherein the reactant is applied to a substrate and then exposed to the coreactant.

19. A process for preparing a coating binder, the process comprising:

mixing a reactant and a gaseous coreactant, the reactant selected from the group consisting of a homopolymer of alpha, beta unsaturated monomers and a copolymer of alpha, beta unsaturated monomers, the homopolymer and copolymer having pendent activated acetylenic groups, the activating group selected from the group consisting of

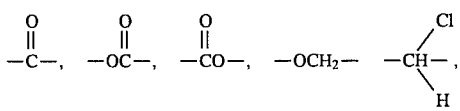

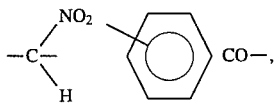

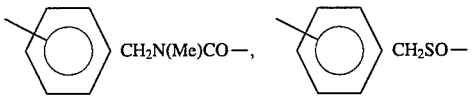

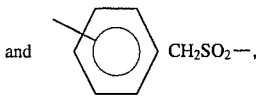

the gaseous coreactant being selected from the group consisting of ammonia, methyl amine, ethyl amine and diethylenetriamine.

20. The process as recited in claim 19 wherein the reactant is applied to a substrate and then exposed to the coreactant.

* * * * *